(12) United States Patent
Hayashi et al.

(10) Patent No.: US 12,182,399 B2
(45) Date of Patent: Dec. 31, 2024

(54) MEMORY SYSTEM AND CONTROL METHOD BASED ON QUAD-SERIAL PERIPHERAL INTERFACE (SPI) CONTROLLER WITH EXTERNAL MEMORY SYSTEM BASED ON SPI STANDARD

(71) Applicant: KIOXIA CORPORATION, Tokyo (JP)

(72) Inventors: Kiyotaka Hayashi, Kawasaki Kanagawa (JP); Kyoko Shoji, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 148 days.

(21) Appl. No.: 17/897,064

(22) Filed: Aug. 26, 2022

(65) Prior Publication Data

US 2023/0259277 A1 Aug. 17, 2023

(30) Foreign Application Priority Data

Feb. 15, 2022 (JP) ................................. 2022-021423

(51) Int. Cl.
*G06F 3/06* (2006.01)
*G06F 13/42* (2006.01)

(52) U.S. Cl.
CPC .......... *G06F 3/0605* (2013.01); *G06F 3/0653* (2013.01); *G06F 3/0679* (2013.01); *G06F 13/4282* (2013.01); *G06F 2213/0002* (2013.01)

(58) Field of Classification Search
CPC .... G06F 3/0605; G06F 3/0653; G06F 3/0679; G06F 13/4282; G06F 2213/0002
See application file for complete search history.

(56) References Cited

U.S. PATENT DOCUMENTS

| | | | |
|---|---|---|---|
| 7,558,900 B2 | 7/2009 | Jigour et al. | |
| 9,324,450 B2 | 4/2016 | Jigour et al. | |
| 10,042,808 B1* | 8/2018 | Kulkarni | G06F 13/1673 |
| 11,360,676 B2* | 6/2022 | Shirakura | G06F 3/0679 |
| 11,416,153 B2* | 8/2022 | Iwata | G06F 3/0679 |
| 2006/0067123 A1 | 3/2006 | Jigour et al. | |
| 2023/0385226 A1* | 11/2023 | Wu | G06F 13/4282 |

FOREIGN PATENT DOCUMENTS

JP 2014-106604 A 6/2014

OTHER PUBLICATIONS

Designing with Cypress Quad SPI (QSPI) F-RAM (Year: 2017).*

* cited by examiner

*Primary Examiner* — Tammara R Peyton
(74) *Attorney, Agent, or Firm* — Kim & Stewart LLP

(57) ABSTRACT

A memory system includes a nonvolatile memory and a serial peripheral interface (SPI) controller communicable with an external controller external to the memory system in accordance with an SPI standard, a first terminal through which the SPI controller receives a command, and a second terminal. The SPI controller is configured to operate in one of a plurality of operational modes in accordance with the command received through the first terminal. The operational modes include a first mode in which a signal received through the second terminal is used as a control signal to perform a predetermined function and a second mode in which the signal is not used as the control signal to perform the predetermined function.

19 Claims, 3 Drawing Sheets

MEMORY SYSTEM AND CONTROL METHOD BASED ON QUAD-SERIAL PERIPHERAL INTERFACE (SPI) CONTROLLER WITH EXTERNAL MEMORY SYSTEM BASED ON SPI STANDARD

CROSS-REFERENCE TO RELATED APPLICATION(S)

This application is based upon and claims the benefit of priority from Japanese Patent Application No. 2022-021423, filed on Feb. 15, 2022, the entire contents of which are incorporated herein by reference.

FIELD

Embodiments described herein relate generally to a memory system and a control method thereof.

BACKGROUND

A capacity of a built-in memory in a system is steadily expanding as a consequence of sophistication of the system. Further, as a consequence of the increase in the capacity of the built-in memory in the system, a semiconductor memory is becoming more widely used. In these circumstances, a highly versatile serial peripheral interface (SPI) is used inside the system, and thus, the demand for SPI-compatible semiconductor memory, such as NOR or SPI NAND, is increasing. The SPI NOR is a NOR memory having an interface compatible with the SPI, and the SPI NAND is a NAND memory having an interface compatible with the SPI. The SPI in the SPI NOR or the SPI NAND may be implemented with six terminals. For that reason, it is possible to provide a large-capacity memory of a giga bit (Gbit) class in a small package with a small number of terminals, which is effective in reducing the area of a mounting substrate on which the semiconductor memory is mounted.

A semiconductor memory device having the SPI (i.e., SPI NOR or SPI NAND) includes external connection terminals corresponding to a power supply (Vcc), ground (Vss), active-low chip select (/CS), serial clock (SCK), serial data input (SI), serial data output (SO), active-low hold input (/HOLD), and write protect (/WP). Among these, the /HOLD terminal is for a signal to temporarily stop data transfer in progress. That is, when a signal input from the host device to the /HOLD terminal is changed from "H" level ($V_{IH}$) to "L" level ($V_{IL}$), an operation of inputting or outputting a command or data may be stopped. Here, the "H" level is a voltage value that is the same as or substantially the same as the voltage level of the power supply Vcc, and the "L" level is a voltage value that is the same as or substantially the same as the voltage level of the ground Vss.

The SPI supports a plurality of operation modes. Among the operation modes, a basic single SPI mode uses SI as serial data input, and SO as serial data output. Meanwhile, a dual SPI mode that enables double of the data rate of the single SPI mode by using the SI and the SO as bidirectional data terminals, and a quad SPI mode that uses also the /WP or the /Hold as bidirectional terminals in addition to the SI and the SO are known. In recent years, due to the demand for a faster interface, operation under the quad SPI mode is becoming more common.

A normal SPI is generally implemented with six terminals, and thus, it is necessary for one terminal (pin) to be in charge of a plurality of functions in the quad SPI mode. For example, it is possible to implement 4-bit data input/output with six terminals by sharing each terminal with the assigned function such as serial data input (SI) and serial data input/output (SOI0) for the SI terminal, serial data output (SO) and serial data input/output (SOI1) for the SO terminal, write protect (/WP) and serial data input/output (SOI2) for the /WP terminal, and active low hold (/Hold) and serial data input/output (SOI3) for the /HOLD terminal.

DETAILED DESCRIPTION

Embodiments provide a memory system capable of disabling a function of an interface more simply.

In general, according to an embodiment, a memory system includes a nonvolatile memory and a serial peripheral interface (SPI) controller communicable with an external controller external to the memory system in accordance with an SPI standard, a first terminal through which the SPI controller receives a command, and a second terminal. The SPI controller is configured to operate in one of a plurality of operational modes in accordance with the command received through the first terminal. The operational modes include a first mode in which a signal received through the second terminal is used by the SPI controller as a control signal to perform a predetermined function and a second mode in which the signal is not used by the SPI controller as the control signal to perform the predetermined function.

Configuration of First Embodiment

Figure 1:
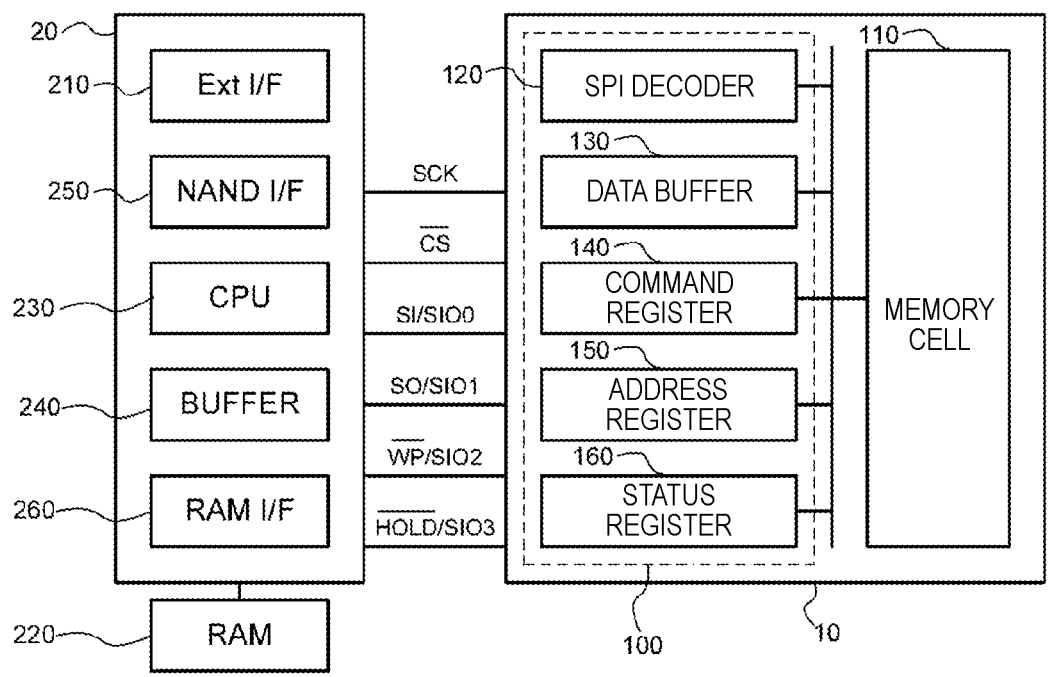
FIG. 1 is a block diagram illustrating a configuration of a memory system according to a first embodiment.

FIG. 1 is a block diagram illustrating an example of a configuration of a memory system 10 according to an embodiment. As illustrated in FIG. 1, the memory system 10 may be connected to a host 20 via a bus. The host 20 is a semiconductor circuit configured as, for example, a system-on-a-chip (SoC). The memory system 10 functions as, for example, an external storage device of the host 20. The host 20 may issue a request to the memory system 10. The request includes a read request and a write request.

The memory system 10 is, for example, a NAND flash memory including a serial peripheral interface (SPI). The host 20 has a function of reading or writing data from/to the memory system 10. The memory system 10 includes a SPI controller 100, and a memory cell 110. The memory cell 110 includes, for example, a serial flash memory chip (not illustrated). The serial flash memory chip includes a plurality of memory cell transistors, and may store data non-volatilely. The SPI controller 100 enables access to the memory cell 110 by a method compatible with the SPI.

The SPI controller 100 includes a SPI decoder 120, a data buffer 130, a command register 140, an address register 150, and a status register 160. The SPI decoder 120 is an arithmetic circuit configured to decode a request (may be referred to as a command), the address, and the data, which are input, by signals compatible with the SPI, and execute the command. The SPI decoder 120 may read data from the memory cell 110 according to the command and the address input.

The data buffer 130 temporarily stores data to be written to the memory cell 110 or data read from the memory cell 110. The command register 140 temporarily stores the command decoded by the SPI decoder 120. The address register 150 temporarily stores the address decoded by the SPI decoder 120. The status register 160 temporarily stores a state (status) read from the memory cell 110 by execution of the command by the SPI decoder 120.

The host 20 includes an external interface (Ext I/F) 210, a central processing unit (CPU) 230, a buffer memory (BUFFER) 240, a NAND interface (NAND I/F) 250, and a RAM interface (RAM I/F) 260. Each of these components is communicably connected to each other by an internal bus.

The host 20 performs a program operation, a read operation, an erase operation, or the like on the memory system 10. The host 20 is a semiconductor circuit configured as, for example, a system-on-a-chip (SoC). The host 20 may be configured as a field-programmable gate array (FPGA), or an application specific integrated circuit (ASIC). The host 20 may be implemented by a plurality of chips. Each function of the host 20 may be implemented by the CPU 230 that executes software (or firmware), dedicated hardware, or a combination thereof. The CPU 230 controls the operation of the host 20.

The external interface 210 is connected to other external devices (not illustrated) via a bus that complies with an interface standard such as a serial advanced technology attachment (SATA) standard, a serial attached SCSI (SAS®) standard, a peripheral component interconnect (PCI) Express (PCIe®) standard, or a system management bus (SMBus®) standard, and implements communication between the host 20 and the external devices.

The NAND interface 250 is connected to the memory system 10, and performs communication between the host 20 and the SPI controller 100. The RAM interface 260 is connected to a RAM 220, and performs communication between the host 20 and the RAM 220.

The RAM 220 provides a working area to the CPU 230 via the RAM interface 260. The buffer memory 240 temporarily stores data transmitted to the memory system 10, and data received from the memory system 10. The RAM 220 and the buffer memory 240 may be implemented by, for example, a dynamic random access memory (DRAM), a static random access memory (SRAM), or a combination thereof. The types of the RAM 220 and the buffer memory 240 are not limited thereto. The buffer memory 240 may be mounted outside the host 20.

The memory system 10 has at least six input/output terminals, each of which is configured to be connected to the host 20. In the example illustrated in FIG. 1, an SCK terminal, a CS terminal, an SI/SIO0 terminal, an SO/SIO1terminal, a WP/SIO2 terminal, and a HOLD/SIO3 terminal are illustrated.

Sharing A Plurality of Functions with Terminal in SPI

The SCK terminal is an input terminal that receives a serial clock, and receives a predetermined clock signal from the host 20. The CS terminal is a terminal for a signal of a chip selection function, and the signal specifies the memory system 10 which is a command target, when a plurality of memory systems 10 is provided.

The SI/SIO0 terminal is an input terminal that receives normal serial input data, and also functions as a data input/output terminal when operating in the dual SPI mode or the quad SPI mode. The SI/SIO1 terminal is an output terminal that outputs normal serial output data, and also functions as a data input/output terminal when operating in the dual SPI mode or the quad SPI mode. The WP/SIO2 terminal is an input terminal to receive a control signal for a hardware writing protecting function in a normal SPI mode, and also functions as a data input/output terminal when operating in the quad SPI mode. The HOLD/SIO3 terminal is an input terminal to receive a control signal for data input stop in the normal SPI mode and the dual SPI mode, and also functions as a data input/output terminal when operating in the quad SPI mode. That is, the SI/SIO0terminal, the SO/SIO1 terminal, the WP/SIO2 terminal, and the HOLD/SIO3 terminal share a plurality of functions with one terminal.

When one terminal is shared for a plurality of functions, it is necessary to stop functions other than one function to be enabled. For example, when in operation under the quad SPI mode, it is necessary to disable the active low hold (/HOLD) function in order to enable the function of SOI3. In order to disable the active low hold (/HOLD) function, for example, it is possible to provide a dedicated setting command to perform a Set Feature function or a Get Feature function in advance. It is noted that the setting by the dedicated setting command will be restored when the system is turned off. Therefore, it is necessary to set every time when the system is turned on.

To address the issue involved in using the dedicated setting command, the memory system according to the embodiment enables data receiving in the quad SPI operation without using the dedicated setting command. Specifically, it is determined whether or not the SPI decoder 120 receives "Program Load x4 (32h)", which is a command in the quad SPI mode, and the HOLD function is disabled based on the determination result. The command "Program Load x4 (32h)" is a command for loading a program in a 4-bit unit. When this command is executed, a series of command sequences of (1) "Write Enable", (2) "Program Load", (3) "Program Execute", and "Get Feature" (acquisition of system status) is operated. The memory system according to the embodiment uses (2) "Program Load" among these for determination.

Figure 2:
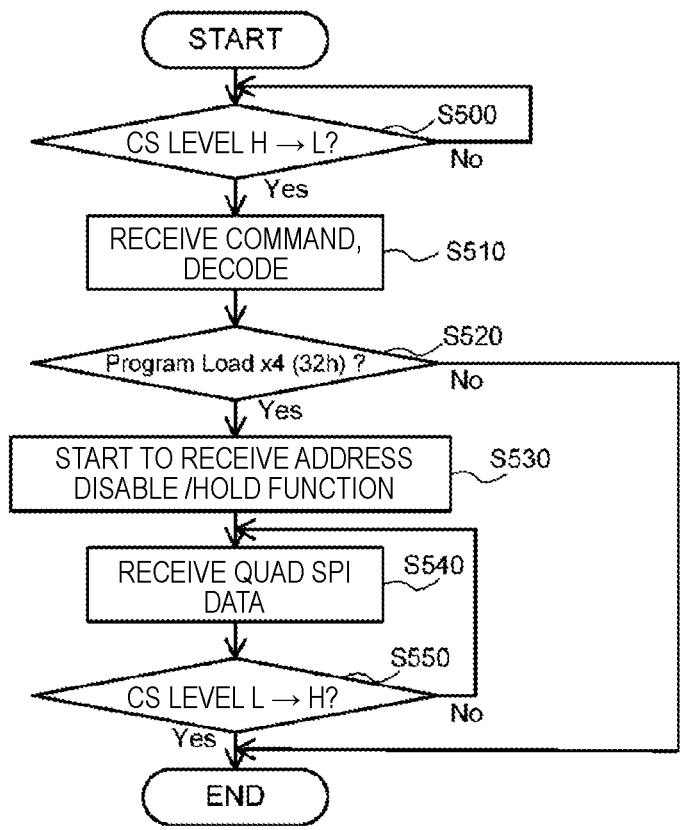
FIG. 2 is a flowchart illustrating an operation of the memory system according to the first embodiment.
Figure 3:
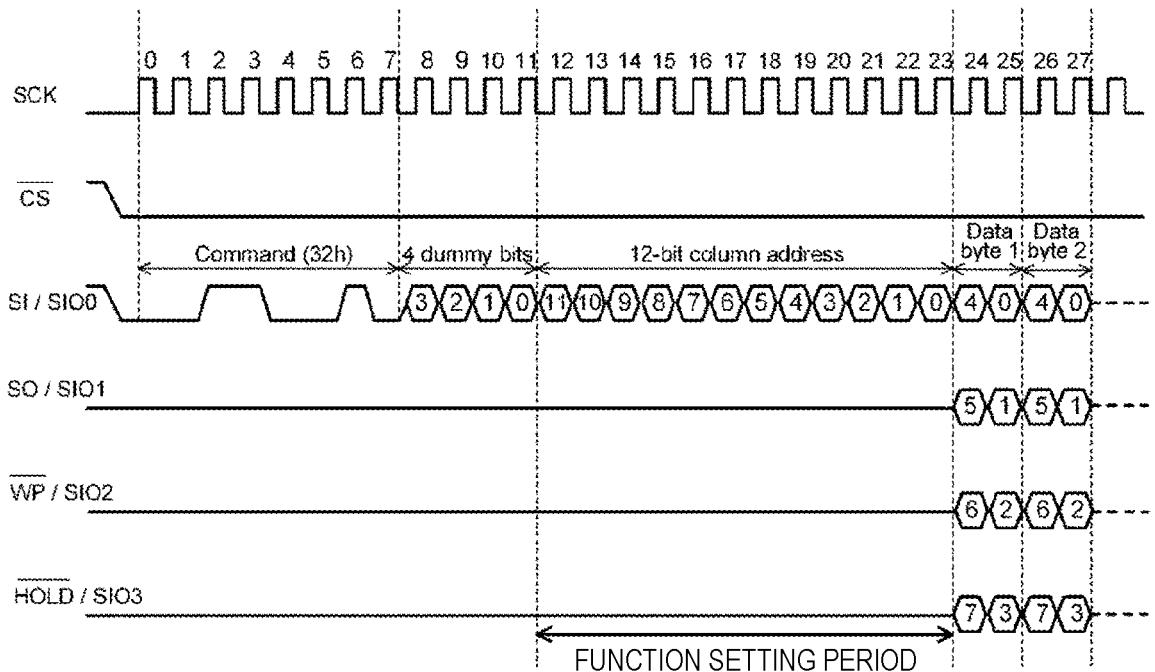
FIG. 3 is a timing chart illustrating a data sequence of the memory system according to the first embodiment.

Hereinafter, an operation of the memory system according to the embodiment will be described with reference to FIGS. 1 to 3. As illustrated in FIG. 3, in the memory system 10, a serial clock is input to the SCK terminal. The CS terminal is normally maintained at the "H" level, and when the SPI decoder 120 detects a transition from the "H" level to the "L" level of the CS terminal (Yes in S500), the SPI decoder 120 recognizes a signal received via the SI/SIO0 terminal as a command. When the SPI decoder 120 receives the command, the SPI decoder 120 stores the received command to the command register 140. The SPI decoder 120 decodes the command recorded in the command register 140 (S510). In the example illustrated in FIG. 3, the SPI decoder 120 receives a bit string of "110010" (32h), and the SPI decoder 120 decodes the contents of this bit string.

The SPI decoder 120 determines whether or not the decoded command is the "Program Load x4 (32h)" (S520). The command "Program Load x4 (32h)" instructs to load a program using four terminals of the SI/SIO0 terminal, the SO/SIO1 terminal, the WP/SIO2 terminal, and the HOLD/

SIO3 terminal. Therefore, receiving the command "Program Load x4 (32h)" means that the HOLD/SIO3 terminal is used as a data input/output terminal with respect to the subsequent data.

When the received bit string is the command "Program Load x4 (32h)" (Yes in S520), the SPI decoder 120 recognizes a signal subsequent to the command as a column address. Simultaneously, the SPI decoder 120 disables the /HOLD function (S530). At this time, the /HOLD function is disabled during the receiving period of the column address ("function setting period" in FIG. 3). This is to prepare for the further subsequent reception of data bytes. In the example illustrated in FIG. 3, the received bit string is 32 h, which corresponds to "Program Load x4 (32h)". The SPI decoder 120 recognizes the subsequent 4 bits as dummy bits, and the next 12 bits as a column address. The SPI decoder 120 stores the received column address to the address register 150.

The SPI decoder 120 receives program data using the four terminals of the SI/SIO0 terminal, the SO/SIO1 terminal, the WP/SIO2 terminal, and the HOLD/SIO3 terminal (S540). As illustrated in FIG. 3, the program data received at this time is received by 4 bits, and constitutes byte data in an 8-bit unit. The received program data is stored in the data buffer 130.

The SPI decoder 120 monitors the level of the CS terminal (S550). While the level of the CS terminal is "L" (No in S550), the signals received through the four terminals are recognized as data. When the SPI decoder 120 detects a transition of the level input to the CS terminal from "L" to "H" (Yes in S550), the SPI decoder 120 ends the reception of the data.

When the command decoded by the SPI decoder 120 is determined to be not "Program Load x4 (32h)" (No in S520), the processing is ended.

As described above, according to the memory system of the embodiment, it is possible to disable non-used functions for the terminals sharing the functions by receiving a non-dedicated command used in the quad SPI mode. Further, since the mode is determined each time when the command is received, it is possible to omit dedicated commands for resetting the functions especially when the system is turned off. In the example described above, the NAND flash memory having the SPI is used, but the present disclosure is not limited thereto. A NOR flash memory having the SPI may also have the same effect.

Second Embodiment

Figure 4:
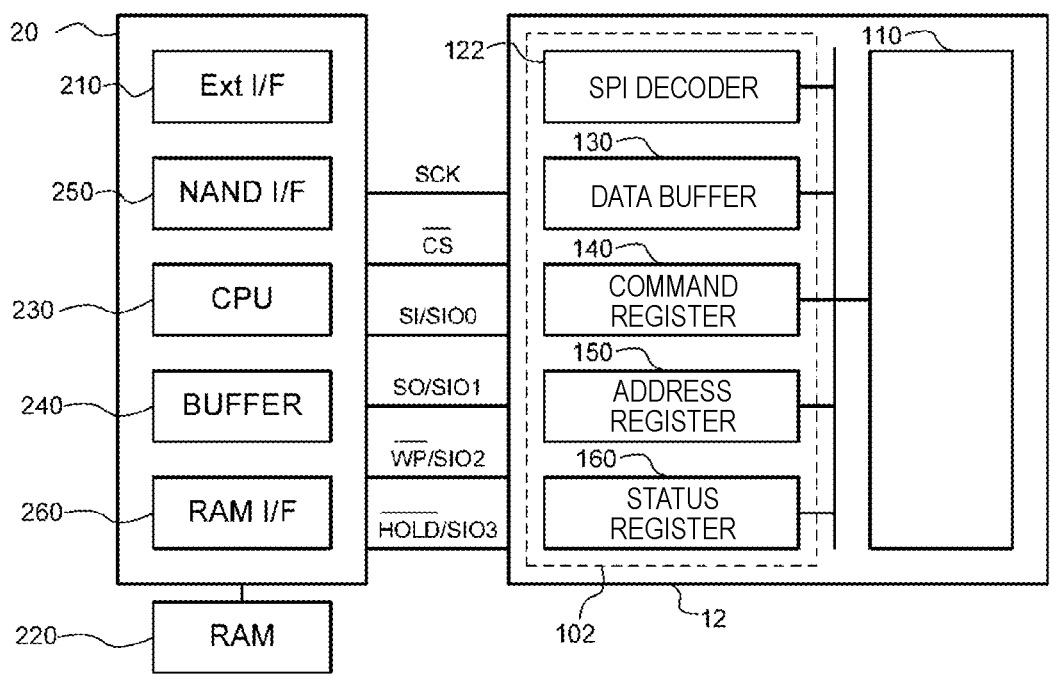
FIG. 4 is a block diagram illustrating a configuration of a memory system according to a second embodiment.
Figure 5:
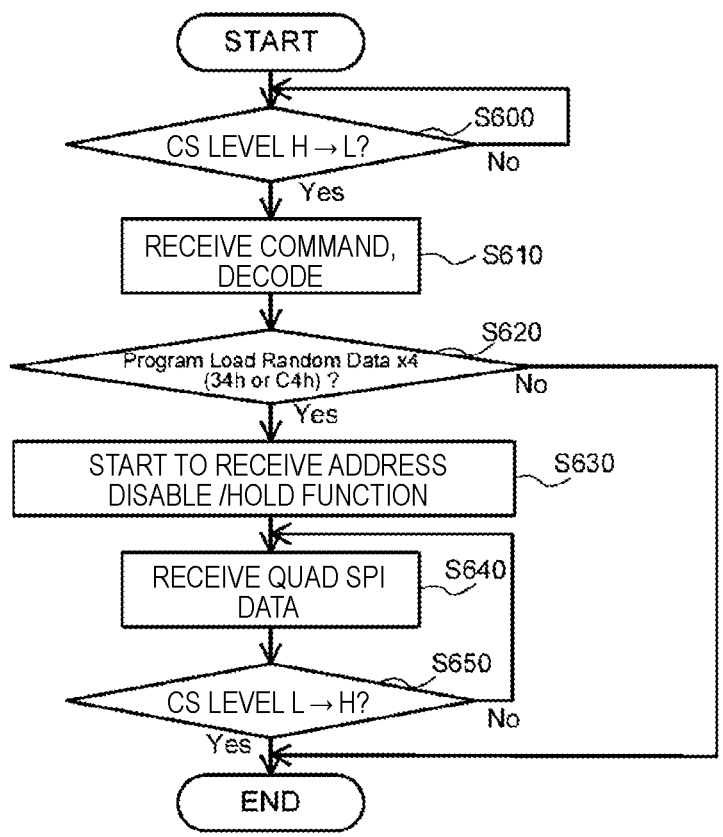
FIG. 5 is a flowchart illustrating an operation of the memory system according to the second embodiment.
Figure 6:
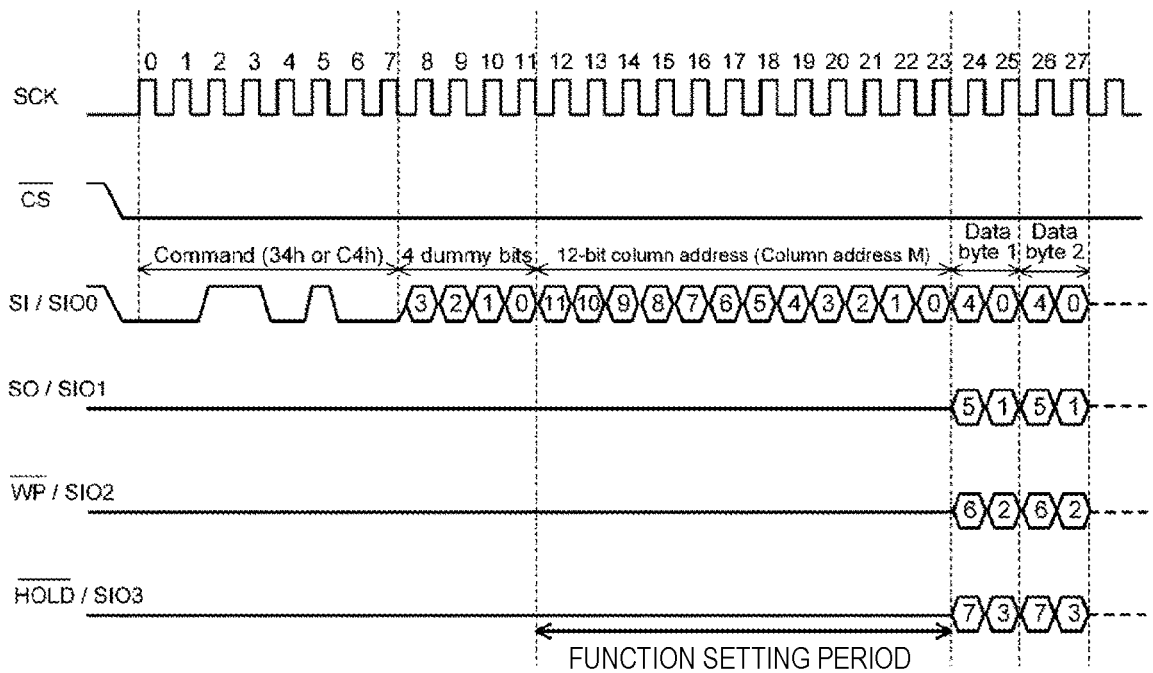
FIG. 6 is a timing chart illustrating a data sequence of the memory system according to the second embodiment.

Subsequently, a memory system according to a second embodiment will be described with reference to FIGS. 4 to 6. As illustrated in FIG. 4, a memory system 12 according to the second embodiment is obtained by changing the configuration of the SPI controller among the configuration of the memory system 10 according to the first embodiment. In the following descriptions, elements common to the first embodiment will be designated by a common reference numeral, and duplicated descriptions will be omitted.

As illustrated in FIG. 4, the memory system 12 includes a SPI controller 102 and the memory cell 110. The SPI controller 102 enables access to the memory cell 110 by the SPI.

The SPI controller 102 includes a SPI decoder 122, the data buffer 130, the command register 140, the address register 150, and the status register 160. The SPI decoder 122 is an arithmetic block configured to decode a command, the address, and the data, which are inputs complying with the SPI, and execute the command. The SPI decoder 122 may read data from the memory cell 110 according to the command and the address input. As compared with the SPI decoder 120 in the first embodiment, the SPI decoder 122 is different in the type of command for determining data transfer by the quad SPI mode. That is, in the second embodiment, the SPI decoder 122 determines whether or not the command sent from the host 20 is "Program Load Random Data x4 (34 h or C4h)".

The command "Program Load Random Data x4 (34 h or C4h)" is a command for loading a program in a 4-bit unit. When this command is executed, a series of command sequences of (1) "Write Enable", (2) "Program Load Random Data (program load)", (3) "Program Execute", and (4) "Get Feature" (acquisition of system status) is operated. The memory system according to the embodiment uses (2) "Program Load Random Data" among these for determination.

Hereinafter, an operation of the memory system 12 according to the second embodiment will be described with reference to FIGS. 4 to 6. As illustrated in FIG. 6, in the memory system 12, a serial clock is input to the SCK terminal. The CS terminal is normally maintained at the "H" level, and when the SPI decoder 122 detects the transition from the "H" level to the "L" level of the CS terminal (YES in S600), the SPI decoder 122 recognizes a signal received via the SI/SIO0 terminal as a command. When the SPI decoder 122 receives the command, the SPI decoder 122 stores the received command to the command register 140. The SPI decoder 122 decodes the command recorded in the command register 140 (S610). In the example illustrated in FIG. 6, the SPI decoder 122 receives a bit string of "110100" (34h), and the SPI decoder 122 decodes the contents of this bit string. The same applies when the SPI decoder 122 receives a bit string of "11000100" (C4h).

The SPI decoder 122 determines whether or not the decoded command is the "Program Load Random Data x4 (34 h or C4h)" (S620). The command "Program Load Random Data x4 (34 h or C4h)" instructs to load a program using four terminals of the SI/SIO0 terminal, the SO/SIO1 terminal, the WP/SIO2 terminal, and the HOLD/SIO3 terminal. Therefore, reception of the command "Program Load Random Data x4 (34 h or C4h)" means that the HOLD/SIO3 terminal is used as a data input/output terminal with respect to the subsequent data.

When the received bit string is the command "Program Load Random Data x4 (34 h or C4h)" (Yes in S620), the SPI decoder 122 recognizes a signal subsequent to the command as the column address. Simultaneously, the SPI decoder 122 disables the /HOLD function (S630). At this time, the /HOLD function is disabled during the receiving period of the column address ("function setting period" in FIG. 6). This is to prepare for the further subsequent reception of data bytes. In the example illustrated in FIG. 6, the received bit string is 34 h, which corresponds to "Program Load Random Data x4 (34h)". The SPI decoder 122 recognizes the subsequent 4 bits as dummy bits, and the next 12 bits as the column address. The SPI decoder 122 stores the received column address to the address register 150.

The SPI decoder 122 receives program data using the four terminals of the SI/SIO0 terminal, the SO/SIO1 terminal, the WP/SIO2 terminal, and the HOLD/SIO3 terminal (S640). As illustrated in FIG. 6, the program data received at this time is received by 4 bits, and constitutes byte data in an 8-bit unit. The received program data is stored in the data buffer 130.

The SPI decoder 122 monitors the level of the CS terminal (S650). While the level of the CS terminal is "L" (No in S650), the signals received through the four terminals are recognized as data. When the SPI decoder 122 detects a transition of the level input to the CS terminal from "L" to "H" (Yes in S650), the SPI decoder 122 ends the reception of the data.

When the command decoded by the SPI decoder 122 is determined to be not "Program Load Random Data x4 (34 h or C4h)" (No in S620), the processing is ended.

As described above, according to the memory system of the embodiment, it is possible to disable non-used functions for the terminal sharing the functions by receiving a non-dedicated command used in the quad SPI mode. Further, since the mode is determined each time when the command is received, it is possible to omit dedicated commands for controlling the functions especially when the system is turned off. In the example described above, the NAND flash memory having the SPI is used, but the present disclosure is not limited thereto. A NOR flash memory having the SPI may also have the same effect.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
    a nonvolatile memory;
    a serial peripheral interface (SPI) controller communicable with an external controller external to the memory system in accordance with an SPI standard;
    a first terminal through which the SPI controller receives a command; and
    a second terminal, wherein
    the SPI controller is configured to operate in one of a plurality of operational modes in accordance with the command received through the first terminal, the operational modes including a first mode in which a signal received through the second terminal is used by the SPI controller as a control signal to perform a predetermined function and a second mode in which the signal received through the second terminal is not used by the SPI controller as the control signal to perform the predetermined function, and
    in the second mode, a second signal of a predetermined length received through the first terminal following the command is used by the SPI controller as an address of the nonvolatile memory to be accessed, and the SPI controller is configured to perform an operation to disable the predetermined function during reception of the second signal used as the address through the first terminal.

2. The memory system according to claim 1, wherein the predetermined function includes a function of pausing communication through the first terminal.

3. The memory system according to claim 1, wherein
    in the first mode, the first terminal is used for data input, and not for data output, and
    in the second mode, each of the first and second terminals is used for data input and data output.

4. The memory system according to claim 1, wherein, in the second mode,
    a third signal received through the first terminal following the address is used by the SPI controller as data to be written into the nonvolatile memory, and
    a fourth signal received through the second terminal in synchronization with the third signal is used by the SPI controller as data to be written into the nonvolatile memory.

5. The memory system according to claim 1, wherein the SPI controller is configured to operate in the first mode when the command indicates the first mode and in the second mode when the command indicates the second mode.

6. The memory system according to claim 1, wherein the command is a command to load data to be programmed.

7. The memory system according to claim 1, wherein
    the first mode is a normal SPI mode in which data to be written into the nonvolatile memory is communicated through one terminal, which is the first terminal, and
    the second mode is a quad SPI mode in which data to be written into the nonvolatile memory is parallelly communicated through four terminals including the first and second terminals.

8. The memory system according to claim 1, further comprising:
    a third terminal, wherein
    the plurality of operational modes includes a third mode,
    in the first mode, the SPI controller uses the third terminal for data output, and not data input,
    in the second mode, the SPI controller uses each of the second and third terminals for data input and data output, and
    in the third mode, the SPI controller uses the third terminal for data input and data output, and the signal received through the second terminal is used by the SPI controller as the control signal to perform the predetermined function.

9. The memory system according to claim 8, wherein
    the first mode is a normal SPI mode in which data to be written into the nonvolatile memory is communicated through one terminal, which is the first terminal,
    the second mode is a quad SPI mode in which data to be written into the nonvolatile memory is parallelly communicated through four terminals including the first and second terminals, and
    the third mode is a dual SPI mode in which data to be written into the nonvolatile memory is parallelly communicated through two terminals, which are the first and third terminals.

10. A method for controlling a memory system including a nonvolatile memory, a first terminal, and a second terminal with a serial peripheral interface (SPI) controller with an external controller external to the memory system in accordance with an SPI standard, the method comprising:
    receiving a command through the first terminal;
    determining an operational mode of the SPI controller to be one of a plurality of operational modes including a first mode and a second mode, based on the command;
    upon determining the operational mode to be the first mode, operating in the first mode in which a signal received through the second terminal is used as a control signal to perform a predetermined function; and
    upon determining the operational mode to be the second mode, operating in the second mode in which the signal received through the second terminal is not used as the control signal to perform the predetermined function, wherein the method further comprises, in the second mode;

using a second signal of a predetermined length received through the first terminal following the command as an address of the nonvolatile memory to be accessed; and performing an operation to disable the predetermined function during reception of the second signal used as the address through the first terminal.

11. The method according to claim 10, wherein the predetermined function includes a function of pausing communication through the first terminal.

12. The method according to claim 10, wherein in the first mode, the first terminal is used for data input, and not for data output, and in the second mode, each of the first and second terminals is used for data input and data output.

13. The method according to claim 10, further comprising, in the second mode:

using a third signal received through the first terminal following the address as data to be written into the nonvolatile memory and a fourth signal received through the second terminal in synchronization with the third signal as data to be written into the nonvolatile memory.

14. The method according to claim 10, wherein the command is a command to load data to be programmed.

15. The method according to claim 10, wherein the first mode is a normal SPI mode in which data to be written into the nonvolatile memory is communicated through one terminal, which is the first terminal, and the second mode is a quad SPI mode in which data to be written into the nonvolatile memory is parallelly communicated through four terminals including the first and second terminals.

16. The method according to claim 10, wherein the memory system further includes a third terminal, the plurality of operational modes includes a third mode, in the first mode, the third terminal is used for data output, and not data input, in the second mode, each of the second and third terminals is for data input and data output, and in the third mode, the third terminal is used for data input and data output and the signal received through the second terminal is used as the control signal to perform the predetermined function.

17. The method according to claim 16, wherein the first mode is a normal SPI mode in which data to be written into the nonvolatile memory is communicated through one terminal, which is the first terminal, the second mode is a quad SPI mode in which data to be written into the nonvolatile memory is parallelly communicated through four terminals including the first and second terminals, and the second third mode is a dual SPI mode in which data to be written into the nonvolatile memory is parallelly communicated through two terminals, which are the first and third terminals.

18. The memory system according to claim 1, wherein the command is a command to access the address of the nonvolatile memory.

19. The method according to claim 10, wherein the command is a command to access the address of the nonvolatile memory.

* * * * *

UNITED STATES PATENT AND TRADEMARK OFFICE
CERTIFICATE OF CORRECTION

PATENT NO. : 12,182,399 B2
APPLICATION NO. : 17/897064
DATED : December 31, 2024
INVENTOR(S) : Kiyotaka Hayashi et al.

It is certified that error appears in the above-identified patent and that said Letters Patent is hereby corrected as shown below:

In the Claims

In Column 10, Claim 17, Line 23, delete "second" after "the".

Signed and Sealed this
Tenth Day of June, 2025

Coke Morgan Stewart
*Acting Director of the United States Patent and Trademark Office*